United States Patent

[11] 3,609,099

| [72] | Inventor | Grant A. Mickelson<br>Yorba Linda, Calif. |
|---|---|---|
| [21] | Appl. No. | 856,143 |
| [22] | Filed | Sept. 8, 1969 |
| [45] | Patented | Sept. 28, 1971 |
| [73] | Assignee | Union Oil Company of California<br>Los Angeles, Calif.<br>Continuation-in-part of application Ser. No. 761,322, Sept. 20, 1968, now abandoned, and a continuation-in-part of 837,340, June 27, 1969, now abandoned. |

[54] METHOD OF ACTIVATING IMPREGNATED CATALYST
19 Claims, No Drawings

[52] U.S. Cl. .................................... 252/435, 252/455 R, 252/458, 252/459
[51] Int. Cl. ........................................ B01j 11/82, B01j 11/06
[50] Field of Search .......................... 252/435, 455, 458; 208/114

[56] References Cited
UNITED STATES PATENTS

| 3,232,887 | 2/1966 | Pessimisis.................. | 252/435 |
| 3,287,280 | 11/1966 | Colgan et al................ | 252/435 |
| 3,459,678 | 8/1969 | Hagemeyer, Jr. et al. .... | 252/435 |
| 3,474,041 | 10/1969 | Kerr........................... | 252/435 X |
| 3,420,771 | 1/1969 | O'Hara et al. ............... | 252/458 X |
| 3,471,399 | 10/1969 | O'Hara........................ | 252/458 X |

Primary Examiner—Daniel E. Wyman
Assistant Examiner—C. F. Dees
Attorneys—Milton W. Lee, Richard C. Hartman, Lannas S. Henderson, Robert E. Strauss and Michael H. Laird

ABSTRACT: Composites formed by the impregnation of refractory oxide supports with thermally decomposable salts of catalytically active metals are activated to produce highly active catalysts by heating the composites at a controlled rate to the prescribed calcination temperature while intimately contacting the composites with at least about 1 and preferably at least about 2 s.c.f.m. of injected air per pound of composite having an initial temperature below about 500° F.

METHOD OF ACTIVATING IMPREGNATED CATALYST

This application is a continuation-in-part of my copending applications Ser. No. 761,322 filed Sept. 20, 1968, now abandoned, and copending application Ser. No. 837,340 filed June 27, 1969.

BACKGROUND AND DESCRIPTION

Hydrocarbon conversion catalyst comprising the oxides and sulfides of numerous metals on refractory oxide supports are conveniently prepared by the impregnation of those supports with aqueous solutions of water-soluble thermally decomposable and/or oxidizable compounds of the desired active metals. The metals of Groups VI and VIII of the Periodic Chart have found wide application in such catalyst and catalyst preparation procedures, particularly in the manufacture of hydrotreating and hydrocracking catalyst. Understandably a great deal of effort has been devoted toward improving the hydrocarbon conversion activity of these catalysts and toward simplifying and improving the methods involved in the production of those compositions. For example, in my copending applications Ser. No. 761,322 filed Sept. 20, 1968, and Ser. No. 837,340 filed June 27, 1969, I observed that marked improvement in the activity of hydrocarbon conversion catalysts comprising Group VI and Group VIII metals is realized by the observance of certain critical parameters in the preparation of the impregnating solutions, during the impregnation of the refractory oxide support, and during drying of the resultant impregnated composite. I have now observed that catalysts of this class can be improved even further by the amelioration or complete elimination of certain detrimental effects which occur during the thermal activation of composites containing thermally decomposable and oxidizable compounds. Such catalysts are extensively employed for a wide variety of hydrocarbon conversions such as hydrofining, e.g., denitrogenation and/or desulfurization, hydrogenation-dehydogenation, hydorcracking and the like.

Heretofore the impregnated composites have been activated by calcination in the most expeditious manner. For example, activation is conventionally effected by exposing the impregnated composites directly to calcination temperatures, e.g., above 800° F. so that the material is rapidly brought to the desired calcination temperature. This approach is logically dictated by the economics of the calcination step. It is obviously preferable to make the most efficient use of the relatively large heating requirements involved in thermal activation of this type. However, during my investigation of this particular aspect of the catalyst preparation procedure, I discovered that dramatic improvement in catalyst activity can be achieved by the observance of conditions during calcination which deviate from the procedures heretofore considered most desirable and which, in the absence of my discovery, appear to unduly complicate the calcination step. I have observed several consequences of the direct calcination procedures heretofore employed that justify the use of calcination conditions which would otherwise appear rather unorthodox in view of the overall objective of the calcination step. However, the consequent improvements in catalyst activity resulting from these procedures more than justify their use.

It is therefore one object of this invention to provide an improved catalyst activation procedure. It is another object of this invention to provide a method for the activation of impregnated catalyst composites which markedly increases the activity of the finished catalyst. It is yet another object of this invention to provide an improved highly active hydrocarbon conversion catalyst. Another object of this invention is the provision of a highly active hydrofining catalyst. It is another object of this invention to provide a hydrocarbon conversion process employing a highly active catalytic composite. Yet another object of this invention is the provision of a highly efficient hydrocarbon hydrofining process and catalyst.

Briefly, the calcination process I have discovered involves the intimate contact of the catalyst particles, pellets, granules, powder, etc., during calcination with a substantial volume of air having a temperature lower than that of the catalyst. For example, the most desirable results are achieved when he catalyst particles, preferably of small particle size, are intimately contacted with at least about 1, generally at least about 2 and preferably about 3 to about 50 s.c.f. of air per pound of catalyst per minute. The extent of aeration required to obtain the dramatic activity improvements in a given system depends on several parameters. For example, greater relative air injection rates are required in batch systems than in continuous systems assuming both systems exhibit comparable contacting efficiencies. This is generally true due to the presence of higher concentrations of fresh untreated catalyst during the early stages of batch calcination. Consequently, more thorough contacting is required to preserve catalyst quality during the early stages of a batch calcination than is necessary in continuous systems such as efficient, continuous rotary calcination. Higher air rates are also desirable at greater catalyst bed depth, larger particle size, higher active component concentration of the catalyst and faster heating rates.

The average temperature differential between the catalyst and air is generally at least about 20° F. preferably at least about 50° F. during heat-up period. In batch calcination, the air temperature is not always below the catalyst temperature. On the contrary, the catalyst temperature generally lags the temperature of the air passed through the catalyst, until the catalyst approaches 300° to 500° F. At that point the catalyst temperature increases very rapidly due to exothermic reactions in the catalyst composite, such as salt decomposition. It is at this point that contact of the catalyst with relatively cool air as described is critical.

It is generally most convenient to inject ambient air into the calcination zone in which the catalyst composite is supported on a permeable grid. The air passes through the grid and over the composite. Some heating of the air may result prior to contact with the composite depending on the design of the specific calcination apparatus. Even so, the initial air temperature, immediately prior to contact with the composite is usually less than 500° F. and preferably less than 300° F.

In accordance with one embodiment of this invention a dried impregnated catalyst composite of a thermally decomposable salt of at least one of the metals of Groups VI and VIII of the Periodic Chart on a refractory oxide support is activated by calcination in an oxygen-containing atmosphere at a temperature of at least about 800° F. and preferably within the range of about 800° to about 1,300° F. while intimately contacting the composite particles during calcination with the described volumes of relatively cool oxygen-containing gas. As demonstrated by the illustrative examples hereinafter detailed, a dramatic increase in finished catalyst activity is realized by this calcination procedure. The exact reason for this effect is not presently attributable to any one factor alone. It is believed that one relevant parameter is the rapid removal of heat from the composite particles, particularly during that period of the calcination in which predominate exothermic reactions occur. One such reaction involves the decomposition of thermally decomposable salts in the impregnated composite. Such decomposition reactions are highly exothermic and result in the creation of hotspots in the catalyst particles if a relatively high temperature differential between the surface of the catalyst particles and the surrounding environment is not maintained during that period. The most critical period is that during which the composite is heated up to the desired calcination temperature. The predominant exothermic reactions, e.g., salt decomposition, generally occur above 300° F. usually from 300° F. to about 800° F.

The nature and extent of the decomposition reactions will of course, depend upon the chemical composition of the impregnating solution and the salts deposited on the refractory oxide, as well as the concentration thereof. For example, the unactivated impregnated composite may contain a variety of salts such as nitrates, sulfates, halides, phosphates, and the like of either the active metals or ammonia or similar basic cations such as the alkali and alkaline earth metals. The calcination of composites containing these compositions results in the occurrence of pronounced exothermic reactions, generally between about 300° and about 800° F. and quite often between about 350° and about 600° F. as indicated by differential thermal analysis. The heat generated by these reactions in a large mass of catalytic particles may be excessive to the point that extremely high surface temperatures result under conventional calcination conditions.

Additional factors which may account, at least in part, for the observed activity improvement are the removal of the gaseous components such as steam and salt decomposition products expelled from the product during calcination. The composition and concentration of these expelled products and the temperatures at which they are expelled will of course depend upon the composition of the impregnated composite. During decompositions of the residual salts in the pores and on the surface of the catalysts, water vapor, ammonia, nitrogen oxides, sulfur oxides, halides, hydrogen halides, and perhaps even minor amounts of the corresponding acids, e.g., nitric, sulfuric, etc., are evolved. These may react with the active metals, metal oxides or refractory oxide support if not immediately removed from the composite particles. For example, the impregnation of a refractory oxide with a solution containing nitrate and ammonium ions results in the formation of ammonium nitrate on the impregnated composite. This salt disassociates at temperatures above 300° F. in a very rapid highly exothermic reaction. Provision of the noted high volumes of oxygen-containing gas, e.g., air, during this period is particularly preferred. However, it is presently preferred that the composites be contacted with the described air rates at least until the desired calcination temperature is reached.

The impregnated compositions treated by this activation procedure can be prepared by impregnating a refractory support with either the water-soluble or insoluble compounds of one or more metals of Groups VII and VIII of the Periodic Chart. Exemplary of the soluble Group VIII metal compounds are salts such as the nitrates, sulfates, acetates, halides, the nitrates and sulfates being particularly preferred. Although impregnation with the corresponding halides can be easily effected, that approach is less preferred due to the evolution of corrosive halide composition products during activation. Exemplary of insoluble Group VIII metal compounds are the carbonates, hydrates and hydroxides.

Exemplary of applicable Group VI metal compounds are the oxides such as molybdenum trioxide, molybdenum blue, tungstic oxide, etc., the acids, e.g., molybdic, tungstic and chromic acids, metal salts such as the ammonium, alkali and alkaline earth metals, e.g., ammonium heptamolybdate, ammonium phosphomolybdate, ammonium paratungstate, and the complex salts of Group VI and VIII metals such as complex cobalt, nickel and phosphomolybdates. These compounds can be added to the support by any known means such as by impregnation, mulling, coprecipitation cogellation, and the like. Impregnation by either dipping or spraying the support powder, pellets, particles, etc., is presently preferred. Solution of the water soluble compounds, especially molybdenum trioxide, molybdic acid, tungstic oxide, tungstic acid, ammonium molybdates and tungstates and the nitrates and sulfates of the Group VIII metals, especially nickel and cobalt form the preferred impregnating solutions. Concentration of the Group VI metal component in the impregnating solutions are generally equivalent to 10 to about 24 weight percent of the corresponding trioxide. The active metals presently preferred due to their activity and ease of handling during catalyst preparation are molybdenum and tungsten of Group VII and nickel and cobalt of Group VIII.

The impregnated composites usually contain from about 5 to about 45 weight percent of the active metal components calculated as the corresponding oxides, preferably from about 10 to about 25 weight percent. When combinations of Group VI and Group VIII metals are employed, the equivalent concentration of the Group VI metal oxide in the inactivated composite is usually about 5 to about 40 weight percent, preferably from about 10 to about 20 weight percent as the molybdate, tungstate, etc. The equivalent concentration of the Group VIII metal oxide is usually about 1 to about 10 weight percent, preferably from about 1 to about 6 weight percent as the salt, e.g., nitrate, sulfate, chloride, etc. The composites can also include additional components such as phosphorous in the form of phosphate ion added during impregnation as described in copending applications Ser. No. 761,322 and Ser. No. 837,340, ammonium carbonates, sulfates, halides, nitrates, etc., formed in the impregnating solution by interaction of the several active metal compounds and/or added base such as ammonium hydroxide, ammonia, or the Group VIII metal hydroxides and carbonates described in copending applications Ser. No. 761,322 and Ser. No. 837,340.

Several procedural steps can be employed in the impregnation of the catalyst substrate with the compositions referred to. The single-dip or pore volume method involves contacting the catalyst support with the impregnating solution generally by dipping for a period sufficient to fill the pores with impregnating medium. The application of vacuum is generally preferred in the latter approach. The impregnating solution can more readily displace air trapped in the interior pore volume of the catalyst support at reduced pressures. The amount of solution and consequently the amount of active components retained on the support will depend largely on the pore volume and surfaces adsorption of the support. In general, the preferred supports, e.g., alumina and silica stabilized alumina containing up to about 40 weight percent silica will have surface areas of at least about 50 square meters per gram and pore volumes of at least about 0.4 cc./gr. sufficient to retain the desired amount of solution in a single step. The presently preferred supports generally have pore volumes of 0.6 to about 1.4 cc./gr. and pore sizes ranging from 100 to 30,000 angstroms. This is one significant advantage of the novel impregnating solutions described in the above noted copending applications. Relatively highly concentrated solutions, containing sufficient amounts of active components to impart the necessary active component concentration on the support in a single-step pore saturation method, can be maintained in stable form for considerable periods, even in the presence of the refractory oxide supports.

Another impregnating method which has found wide application due to the previous necessity for maintaining relatively low active component concentrations is the cyclic or multidip procedure wherein the active support is repeatedly contacted with impregnating solution with or without intermittent drying. As previously mentioned, this procedure is less desirable in that is necessitates the use of procedures far more complicated than the single-dip or spray technique. Yet another procedure employed by the prior art, which is not necessary with these impregnating solutions involves a prolonged contacting step at slightly elevated temperatures, e.g., 100° F. to promote the precipitation of active components onto the support.

As pointed out in my above noted copending applications, the formation of crystalline precipitates as such during the impregnation step should be avoided. Therefore the use of impregnation methods which result in the formation of precipitates or crystalline deposits is not preferred, since the avoidance of these effects enables the production of more active catalysts. However, the improvements in activity which result from the novel activation procedures herein discussed are observed in composites produced in essentially any manner although the methods discussed in my noted copending applications produced catalysts of markedly superior activity.

The carrier may be any conventional foraminous catalyst carrier such as silica, alumina, magnesia, zirconia, silica-alumina, silica-magnesia, kaolin, kieselguhr, activated carbon, pumice, crystalline and amorphous aluminosilicates, etc. Pretreatment, such as calcination or steaming of the carrier is usually employed. Types of carrier, preparation thereof, methods of pretreatment and the procedures employed in impregnation of the carrier are all conventional and are disclosed in detail in the above-mentioned U.S. patents. The preferred carrier for use in the present invention is alumina, preferably stabilized with up to about 40 percent of silica.

A particularly preferred impregnated composite and a method for preparing the same is described in my copending application Ser. No. 837,340 filed June 27, 1969, which is a continuation-in-part of my copending application Ser. No. 761,322, filed Sept. 20, 1968. Those applications describe the preparation of highly active hydrocarbon conversion catalysts of molybdenum and Group VIII metals by impregnating refractory oxides with highly stable solutions of soluble compounds of the active metals and an acid of phosphorous at $P/MoO_3$ weight ratios of from about 0.1 to about 0.25 and initial pH values of about 1 to about 2. As discussed in the noted copending applications, impregnating solutions having a prescribed $P/MoO_3$ ratios and initial pH values are highly stable and enable the use of impregnating solutions of much higher concentration so that the desired amounts of active metal components can be deposited on the refractory oxide in a single impregnating step. Although composites prepared by those procedures are presently preferred, the applicability of the activation process herein described and the dramatic increase in catalyst activity resulting therefrom are in no way limited to systems involving composites prepared by the procedures described in my copending applications.

In accordance with the presently preferred single-step impregnation technique the desired molybdenum compound e.g., ammonium heptamolybdate, is dissolved, or partially dissolved and partially suspended in water. The acid of phosphorus, e.g., orthophosphoric acid, preferably in the concentrated form (75-85 weight percent) is then added in such quantity that the equivalent weight ratio of phosphorus to molybdenum trioxide in the solution is about 0.1 to about 0.25, preferably 0.12 to about 0.20. The molybdenum and phosphorous compounds are added in such amounts that the resultant absolute concentrations of each fall within the ranges previously described. The initial pH of the resultant solution is usually within the range of about 1.0 to about 2.0. Under these conditions all of the molybdenum compound is dissolved. As previously mentioned, the pH can be increased slightly if desired by the addition of one or more of the basic materials described. If pH reduction within this range is desired, additional acid of phosphorus should be added. The Group VIII metal compound, e.g., nickelous nitrate, preferably in solution as the hexahydrate salt, is then added to the solution of the phosphorous acid and Group VI metal compound to produce a final composition preferably having an equivalent Group VIII metal oxide concentration of about 2 to about 5 weight percent.

The resulting impregnated composites are then dried and activated by calcination under the conditions described. Although the drying and calcination can both be effected in a single step, it is presently preferred that the composites be dried prior to subjecting them to the elevated temperatures involved in calcination. In the presently preferred drying procedure described in my copending applications, the wetted impregnated catalyst particles are gradually dried at a temperature within the range of about 180° to about 350° F., preferably from about 200° to 250° F. by heating gradually to that temperature, e.g., at about 20 F./minute, or less, and maintaining the composite at temperature for 10 minutes to about 10 hours, to reduce the water content to less than about 4 weight percent, preferably 1 to 2 weight percent.

The advantages of the preferred impregnating method and the manner in which it contributes to improvements in catalyst activity are associated, at least in part, with the manner in which the active components are distributed on the support surface. On the other hand, the advantages associated with the novel calcination process herein described and the characteristics of the composites necessary to enable the accomplishment of those objectives are believed to relate more to the overall composition and structure of the composite rather than to the manner in which the active components are distributed on the catalyst carrier. As a result, the novel calcination procedure finds application in the activation of catalysts prepared by any impregnation procedure having chemical compositions similar to the catalyst herein described.

The preferred calcination can be accomplished by any one of several procedures, provided precaution is taken to facilitate intimate contacting of the volumes of air required and the composite particles. It is also presently preferred that the particle size of the composites be relatively small, i.e., about ⅛ inch or less and preferably not substantially greater than about 1/16 inch average diameter. Substantial benefit can be achieved by this calcination process when using particles of larger average diameters although more active products result from the use of relatively small particles. Actually, an even more significant effect can be realized by the use of powders, although the formation of pellets from calcined powders is relatively difficult. It is therefore generally preferred that the pellets can be produced before calcination, although they should be relatively small in order to derive the most benefit from the activation step.

The described calcination can be conducted in fluid calciners, fixed bed calciners at gas and velocities insufficient to fluidize the catalyst particles, rotary drum calciners, vibratory or chain-type conveyors, and similar apparatus having provision for intimately contacting the catalyst particles throughout the calcination process with the noted volumes of air. This contacting requirement is easily met in fluid calciners. However, these systems require the use of a fixed bed calciner wherein the composite to be calcined is positioned on a screen or grid in the interior of an elongated passageway through which the required amount of air is passed over the catalyst. When rotary calciners are used they should be provided with radially inwardly extending baffles which pick up the catalyst particles on rotation of the drum and drop them through a stream of air provided by air jets positioned on the interior of the rotary drum calciner so that intimate contact between the catalyst particles and air is achieved. The air stream with which the catalyst particles are contacted can be preheated although it is presently preferred that the air be introduced to the calciner at ambient temperature. In any event, the contacting air stream should be introduced at a temperature below about 300° F. so that it contacts the catalyst at a temperature less than about 500° F., preferably below 300° F. As a general rule, sufficient air should be introduced into the calciner in proportion to the catalyst depth in the calciner, the temperature of the catalyst particles and retention time in the calciner, e.g., at least about one hour, to maintain an average temperature differential between the catalyst particles and the surrounding air of at least about 50 F.° when the catalyst reaches temperatures of about 300° F. and above.

The catalysts of this invention can be employed in any of the several hydrocarbon conversion systems for which catalytic composites of Group VI and VIII metals are known to be effective, such as hydrogenation, dehydrogenation, desulfurization, oxidation, denitrogenation, demetalization, isomerization, cracking, e.g., hydrocracking, and the like. Hydrocarbon feeds employed in such systems include every form and molecular weight of hydrocarbon compound. However, these catalysts are most commonly used to convert hydrocarbons boiling from about 200° to about 1,100° F. Hydrogen is generally present in the system involving hydrofining, cracking, demetalization, and the like, at partial pressures usually in excess of 50 p.s.i., generally 100 to 3,000 p.s.i. Conversion temperatures also vary considerably with the type of feed and the conversion desired. Most often conversion takes place at temperatures above 600° F., usually between 650° and 800° F. The preferred catalysts prepared by single-dip pore saturation with the highly stable relatively concentrated solutions exhibit such increased hydrofining activity that they can be economically employed for denitrogenating and desulfurizing feeds boiling up to about 1,100° F. Such heavy feeds could not be feasibly treated with catalysts previously available. Temperatures involved in hydrofining such high end point stocks are usually about 700 to about 800° F. Hydrogen partial pressures of 750 to 2,000 p.s.i. are generally employed.

The following examples serve to more particularly illustrate the invention and the advantages thereof.

EXAMPLES 1-6

The characteristics and advantages of the preferred activation procedure are illustrated by the following examples. In these examples composites prepared by single dip impregnation and activated by several different procedures were evaluated with regard to hydrofining activity. The chemical composition and denitrogenation activity of the catalysts prepared in each example are summarized in table 1.

The impregnating solution was prepared by partially dissolving 410 g. of ammonium heptamolybdate in 750 ml. of distilled water, adding 170 g. of concentrated phosphoric acid (85% $H_3PO_4$),240 g. of nickelous nitrate hexahydrate and enough water to make up to 1,119 ml. of solution at 86° F. with a pH of 1.2 to 1.3. This solution was used to immerse 500 g. of 1/16-inch silica stabilized alumina extrudates containing 4.95 weight percent silica. The flask containing the solutions and extrudate was evacuated to about 20 to 24 inches of Hg and shaken intermittently for 15 minutes. The excess solution was then separated from the wet extrudates of a 05 buckner funnel without filter paper. The wet pallets were dried and calcined by several different techniques described in the following examples. In each instance that air was introduced into the furnace, the inlet air temperature was 75° F.

EXAMPLE 1

The wet impregnated pellets were dried in an oven at 200° F. and held in the oven overnight (16 hrs.). The dried pellets were calcined in a top-opening Kress muffle furnace on a stainless steel screen tray at a rate of 50 F.°/hr. to 900° F. and held at 900° F. for 2 hours. Ambient air at 750° F. was passed into the bottom of the furnace at a rate of about 7 s.c.f.m. per pound of catalyst.

EXAMPLE 2

The wet impregnated pellets were placed on the stainless steel screen tray and dried and calcined at a rate of 50 F.° per hour with a flow of compressed ambient air (75° F.) into the bottom of the Kress furnace at about 7 s.c.f.m. per pound. The average temperature differential between the catalyst and ambient air was about the same as in example 1.

EXAMPLE 3

The wet impregnated extrudates were ovendried by heating gradually to 190° F. and held at that temperature for 16 hours. The dry extrudates were then placed in a pyroceran dish in a bed about 2 to 2½ inches deep and calcined in a Lindberg muffle furnace without air injection. The heating rate was as rapid as possible, 900° F. being reached in about 45 minutes. The specimen was held at 900° F. for an additional 60 minutes. The ambient reaction temperature and the temperature in the catalyst bed were continuously recorded. The temperature in the catalyst bed lagged behind that of the furnace up to about 400° F. The catalyst bed temperature then increased very rapidly and reached 800° F. in less than 10 minutes at which time the bed temperature was about 200 F.° hotter than the ambient furnace temperature. At that point the temperature of the ambient air in contact with the catalyst was at least 200 F.° less than the catalyst temperature. The furnace temperature was monitored by a thermocouple positioned immediately above the catalyst bed. This thermocouple was in intimate contact with air exiting upwardly out of the bed and was exposed to the furnace radiant-heating elements. The catalyst temperature was monitored by a thermocouple in intimate contact with the catalyst bed. Consequently the temperature of the air in contact with the catalyst must have been at least 200 F.° below the catalyst temperature at that point in the calcination. It is presently believed that mitigation of the immense localized heat buildup associated with this exothermic decomposition contributes, at least in part, to the dramatic activity improvement realized by this procedure.

EXAMPLE 4

The wet impregnated extrudates were spread on the stainless steel screen tray in the Kress box muffle furnace preheated to 900° F. Air was passed into the bottom of the furnace at about 7 standard cubic feet per pound of catalyst per minute. The extrudates were very rapidly dried and heated to 900° F. in about 25 minutes. Salt decomposition began in a few minutes and was completed in about 10 minutes. The specimen was held in the furnace for an additional two hours at 900° F. The temperature of the ambient air after passing through the catalyst was at least about 20 F.° below the catalyst temperature after the catalyst reached a temperature of 300° F.

EXAMPLE 5

The wet impregnated extrudates were dried and calcined in a manner identical to example 1 but were heated only to 800° F. and held at that temperature for 2 hours.

EXAMPLE 6

A layer of wet impregnated extrudates ¼ inches deep on a square stainless steel screen tray was placed in a large oven with a circulating fan. Air was not injected during This operation. The oven was heated gradually at an average rate of 60 F.° per hour to 650° F. The extrudates were then removed and placed in a pyroceran dish and calcined an additional hour at 650° F. in a muffle furnace with a good air purge. The extrudates of this specimen contained cores of darker colored material and did not appear to be completely activated. This conclusion was verified by the low activity of the resultant catalyst.

TABLE 1

| Example Number | Percent | | | Calcination temp., ° F. | Heat rate, ° F./hr. | Time at cal. temp., hr. | Air rate, SCFM/lb. | Denitrogenation activity | |
|---|---|---|---|---|---|---|---|---|---|
| | $MoO_3$ | NiO | P | | | | | Hours on feed | Percent of ref. |
| 1 | 18.4 | 2.97 | 2.96 | 900 | 50 | 2 | 7 | 60 | 150 |
| 2 | 18.2 | 2.96 | 3.04 | 900 | 50 | 2 | 7 | 60 | 154 |
| 3 | 17.4 | 2.93 | 2.81 | 900 | 930 | 1 | None | 52 | 100 |
| 4 | 17.7 | 2.94 | 2.91 | 900 | (a) | 2 | 7 | 60 | 125 |
| 5 | 18 | 3 | 3 | 800 | 50 | 2 | 7 | 60 | 150 |
| 6 | 17.4 | 2.93 | 2.81 | 650 | 60 | 1 | (b) | 32 | 98 | a 900° F. reached in 25 minutes.
b Internal air culation and nominal bleed.

These results demonstrate that catalysts activated in the presence of a vigorous air supply have markedly higher activity than those activated at conventional conditions. The catalyst of example 5 which was calcined to a maximum temperature of only 800° F. is just as active as those calcined to a maximum temperature of 900° F. However, the catalyst of example 6 which was calcined to a maximum temperature of only 650° F. with good air circulation, was definitely inferior. Example 3, supra, and several of the following examples show conclusively that activation of composites in the absence of the prescribed aeration produces catalysts of markedly inferior denitrogenation activity.

EXAMPLES 7–13

The following examples illustrate the effect of intimate contact between air and catalyst in a commercial rotary calciner. The extrudates employed in these examples were prepared as follows. Two hundred and sixty-one pounds of 28% $MoO_3$ liquor, prepared by adding ammonia to $MoO_3$ powder suspended in water, was added to a weigh tank and 36.4 pounds of ammonium dimolybdate crystals were added and dissolved in the same tank. Then 73 pounds of 75% orthophosphoric acid was gradually added to the above solution. The pH of the resulting combination was about 1.7. Next 68 pounds of nickelous nitrate hexahydrate crystals were added and dissolved. The pH of the resulting solution was about 1.2. This solution was then diluted with water to produce a composition containing 22.5 weight percent $MoO_3$; 3.8 weight percent NiO and 3.8 weight percent phosphorus on an equivalent basis at a pH of 1.2.

Support extrudates, 400 pounds per batch, were weighed and transferred to a rotating drum about 4 feet in diameter and 12 feet long, with baffles and plows to thoroughly mix the wetted extrudates. The impregnating solution was then sprayed onto the extrudates through a spray bar with six nozzles. About 14 minutes were required to spray the solution onto the pellets and to wash down the vessel and displace the solution in the lines with water. Each batch of sprayed extrudates were agitated for another 10 minutes and then transferred to two 55 gallon drums and aged for about 2 hours under ambient conditions.

The aged extrudates were dried for 30 minutes in a through-circulation Proctor and Schwartz moving perforated belt drier with hot air and combustion gases at 250° F. fed at the discharge end of the belt.

Portions of the dried extrudates were activated under different conditions in a commercial rotary calciner 26 feet long, 3 feet in diameter, and externally heated in three 6-foot sections by independently controlled gas burners. The shell temperature was maintained at about 400° F. in the heating zone nearest the feed end of the kiln, 600° F. in the center sections and 900° F. in the heating zone closest to the discharge end. The end plate at the discharge end of the kiln was removed to provide a free flow of air into the rotary kiln. In each run ambient air at 70° F. was drawn through the rotating cylinder counter current to the flow of the extrudate at a rate of about 350 s.c.f.m. Several runs were made at different feed and kiln rotation rates. The feed rate and the rotation rate of the kiln determined the amount of material in the kiln at any moment which was used to determine the depth of the bed of extrudates moving through the kiln. The kiln rotation rate determined the residence time of the extrudates in the kiln. A composite sample of the extrudates discharged from the kiln was taken from each run after equilibrium conditions had been established. The variables studied for each run and the composition and denitrogenation activity of the catalyst obtained are shown in table 2.

TABLE 2.—SPRAY IMPREGNATED EXTRUDATES ACTIVATED IN A COMMERCIAL ROTARY CALCINER

| Example number | Rotation rate of kiln, r.p.m. | Feed rate, lbs. per min. | Extrudate bed depth in kiln during activation, inches | Extrudate residence time in kiln, minutes | Relative air injection rate, SCGM/lb. | Chemical composition, weight percent | | | Denitrogenation activity test | |
|---|---|---|---|---|---|---|---|---|---|---|
| | | | | | | $MoO_3$ | NiO | P | Hrs. on feed | Percent of reference catalyst |
| 7 | 1.65 | 1.5 | 1 | 37 | 6.4 | 19.4 | 3.39 | 2.88 | 60 | 134 |
| 8 | 1.65 | 3 | 2 | 37 | 3.2 | 19.2 | 3.34 | 3.16 | 60 | 140 |
| 9 | 1.65 | 6 | 4 | 37 | 1.6 | 18.5 | 3.58 | 3.22 | 60 | 132 |
| 10 | 1.65 | 9 | 6 | 37 | 1.1 | 18.3 | 3.40 | 3.44 | 60 | 137 |
| 11 | 1.65 | 11 | 8.5 | 37 | 0.86 | 20.4 | 3.48 | 3.15 | 60 | 115 |
| 12 | 0.38 | 3 | 9.5 | 150 | 0.78 | 19.4 | 3.44 | 3.22 | 60 | 123 |
| 13 | 0.38 | 0.5 | 2 | 150 | 4.7 | 19.4 | 3.37 | 3.21 | 60 | 140 |

The activity ratings of all the catalysts except two, examples 11 and 12, were substantially in excess of the conventional catalyst and ranged from 130 to 150 percent of the reference catalyst. The compositions of all the calcined products were essentially the same. The catalysts of examples 11 and 12 definitely had lower denitrogenation activities than did the remaining catalyst. In those runs the depth of the bed of extrudates in the kiln during activation was about 9 inches, higher than any other operation. The lower activity of these products is believed to be due to the lack of intimate contacting between the air and the catalyst during activation. It is also evident, by comparison of examples 12 and 13, that residence time is not a critical factor as long as sufficient time is allowed to effect complete activation. However, the necessity of maintaining a relatively low bed depth of less than about 8 inches, preferably less than 6 inches, to promote intimate contacting between the air and catalyst is readily apparent. Higher rotation rates, i.e., 0.5 to 2 r.p.m., are also generally preferred as higher catalyst distribution rates and better contacting are thereby achieved.

These results, particularly example 10, further demonstrate that relative air injection rates as low as 1.1 s.c.f.m./lb. can be effective in a continuous process at otherwise suitable conditions. It is believed that such lower air injection rates can be tolerated in a continuous system because a substantial portion of the catalyst in the kiln has already passed through the critical stage, i.e., the temperature range of 300° to 900° F. Consequently the deleterious thermal composition occurs at a relatively more moderate rate in a continuous system than in a batch system operating on the same total amount of catalyst. Even so, it is presently preferred to maintain a relative injection rate of at least about 2 s.c.f.m./lb. in continuous systems. Observations of that limit is much more essential in batch systems.

EXAMPLES 14–19

Six samples of the dry feed to the calciner in examples 3–10, 12 and 13 were calcined by the procedure described in example 1. Inlet air temperature was 75° F. in each instance. The characteristics of the resulting product and the activity of the catalysts are reported in table 3.

TABLE 3.—CALCINATION CONDITIONS

| Example Number | Catalyst charge, lbs.[a] | Injection rate, SCFM/lb. | Rate of heating, °F./hr. | Max. temp., °F. | Chemical composition, weight percent | | | Denitrogenation activity | |
|---|---|---|---|---|---|---|---|---|---|
| | | | | | $MoO_3$ | NiO | P | Hrs. on feed | Percent of reference catalyst |
| 14 | 1.54 | 4.8 | 50 | 900 | 19.2 | 3.34 | 3.16 | 60 | 150 |
| 15 | 1.54 | 4.8 | 50 | 900 | 19.0 | 3.32 | 3.17 | 60 | 150 |
| 16 | 1.54 | 4.8 | 50 | 900 | 19.4 | 3.39 | 2.88 | 60 | 146 |
| 17 | 1.54 | 4.8 | 50 | 900 | 19.4 | 3.37 | 3.21 | 60 | 161 |
| 18 | 1.54 | None | 50 | 900 | 19.4 | 3.37 | 3.21 | 60 | 107 |
| 19 | 1.54 | None | 50 | 900 | 19.4 | 3.39 | 2.88 | 60 | 114 |

[a] Catalyst weight diminished about 14% on further drying and calcination.

It is apparent that the more intimate contacting of the air at the same equivalent air rate achieved in the batch calcination system results in the production of a catalyst having even higher denitrogenation activity, i.e., 150 percent of the activity of the reference catalyst. The necessity of providing intimate contact between substantial volumes of air and the catalyst during calcination is again demonstrated by comparison of examples 18 and 19 to examples 14 through 17. In examples 18 and 19 the absence of air resulted in the production of catalysts having relative activities of only 107 and 114 percent respectively, whereas the catalysts of examples 14–17 has substantially higher activities of 146 to 161 percent.

I claim:

1. The method of thermally activating a composite of a foraminous support and at least one thermally decomposable compound of the metals of Groups VI and VIII, including the steps of heating said composite to a calcination temperature of at least about 800° F. while intimately contacting said composite with an oxidizing gas injected into intimate contact with said composite at a rate of at least about 2 s.c.f.m. per pound of said composite.

2. The method of claim 1 wherein said composite comprises at least about 1 weight percent of at least one compound of at least one metal selected from Groups VI and VIII of the Periodic Chart convertible to the corresponding metal oxide upon exposure to said oxidizing gas at said calcination temperature.

3. The method of claim 1 wherein said composite is formed on impregnation of a foraminous support with a catalytic amount of at least one thermally decomposable water-soluble compound of the Group VI and VIII metals, convertible to the corresponding metal oxide upon exposure to said oxidizing gas at said calcination temperature, and said composite is heated to said calcination temperature at a rate of less than about 400° F. per hour.

4. The method of claim 1 wherein said composite is formed by impregnation of a foraminous support with the aqueous system which forms upon mixing water and at least one of ammonium dimolybdate, ammonium phosphomolybdates, ammonium heptamolybdate, molybdic acid, molybdenum oxide, molybdenum blue and iron Group VIII metal complex molybdates and phosphomolybdates, and at least one of the nitrates, sulfates, halides, carbonates, hydrates and acetates of the Group VIII metals.

5. The method of claim 1 wherein said composite is formed on impregnation of a foraminous support with an aqueous solution of ammonium heptamolybdate and at least one of the nitrates, sulfates, fluorides, chlorides and bromides of nickel and cobalt.

6. The method of claim 5 wherein said solution further comprises at least one acid of phosphorous.

7. The method of thermally activating a composite of a foraminous carrier and at least one of the nitrates, sulfates, halides, carbonates and acetates of at least one cation selected from ammonium and the metals of Group VI and VIII, ammonium molybdate, ammonium tungstate, ammonium chromate, molybdic acid, tungstic acid, chromic acid and molybdenum blue, including the steps of drying said composite, gradually increasing the temperature of the resultant dried composite to a calcination temperature within the range of about 800° to about 1,300° F. sufficient to thermally activate said composite and intimately contacting said composite during at least that portion of said calcination during which said compounds are decomposed with at least about 2 s.c.f.m. of an oxidizing gas per pound of said composite injected into intimate contact with said composite.

8. The method of claim 7 wherein said foraminous carrier is selected from alumina, silica, silica-stabilized alumina and aluminosilicates, said composite comprises about 1 to about 20 weight percent of at least one of the sulfates and nitrates of iron, cobalt and nickel, said composite is dried at a temperature within the range of about 180° to about 350° F. for at least about 10 minutes sufficient to reduce the physisorbed water content thereof to about 4 percent or less and said composite is calcined by heating the same to said calcination temperature at a rate of less than about 400 F.° per hour.

9. The method of claim 8 wherein said composite is contacted with about 3 to about 50 s.c.f.m. of said gas per pound of said composite during the period in which the temperature of said composite is increased to said calcination temperature.

10. The method of thermally activating a composite formed by the impregnation of a foraminous support with an aqueous system which forms on admixing water and at least one of ammonium heptamolybdate, molybdic acid, molybdenum trioxide and molybdenum blue and at least one salt of a Group VIII metal base and a strong mineral acid, which comprises contacting said composite at a calcination temperature of at least about 800° F. and intimately contacting said composite with an oxidizing gas having an initial temperature prior to contact with said composite of less than about 500° F. at a rate of at least about 2 s.c.f.m. of said oxidizing gas per pound of said composite.

11. The method of claim 10 wherein said composite is formed by impregnation of a foraminous support with the solution which forms on admixing water and at least about 10 weight percent of ammonium heptamolybdate and at least about 1 weight percent of at least one of the nitrates, sulfates, fluorides, chlorides and bromides of nickel and cobalt.

12. The method of claim 11 wherein said solution further comprises at least one acid of phosphorus selected from orthophosphoric, metaphosphoric, pyrophosphoric and phosphorous acids.

13. A continuous method for thermally activating a composite of a foraminous support and at least one thermally decomposable compound of the metals of Groups VI and VIII, including the steps of substantially continuously passing said composite to a heating zone substantially continuously removing thermally activated composite from said heating zone and heating said composite in said zone to a temperature of at least about 800° F. while intimately contacting said composite with an oxidizing gas at a rate of at least about 1 s.c.f.m. of said oxidizing gas per pound of said composite retained in said heating zone.

14. The method of claim 13 wherein said continuous heating zone is a rotary calciner and said composite is contacted with said oxidizing gas at a rate of at least about 2 s.c.f.m. per pound of said composite.

15. The method of claim 13 wherein said composite comprises at least one of the nitrates, sulfates, halides, carbonates and acetates of at least one cation selected from ammonium and the metals of Groups VI and VIII, ammonium molybdate, ammonium tungstate, ammonium chromate, molybdic acid, tungstic acid, chromic acid and molybdenum blue, said composite is heated to a temperature within the range of about 800° to about 1,300° F. sufficient to thermally decompose said thermally decomposable compound while intimately contacting said composite with said oxidizing at a rate of at least about 2 s.c.f.m. per pound of said composite retained in said heating zone.

16. The method of claim 14 wherein the average bed depth of said composite within said rotary calciner is less than about 8 inches and said oxidizing gas has an initial temperature of less than about 300° F. prior to contacting in said heating zone.

17. The method of claim 1 wherein said composite comprises at least about 1 weight percent of at least one compound of the metals of Groups VI and VIII convertible to the corresponding metal oxide upon exposure to said oxidizing gas at said calcination temperature and the initial temperature of said oxidizing gas prior to contact with said composite is less than about 500° F.

18. The method of claim 7 wherein the initial temperature of said oxidizing gas prior to contact with said composite is at least 20° F. lower than the temperature of said composite during at least that portion of said activation during which said metal compounds are thermally decomposed.

19. The method of claim 13 wherein said heating zone is a rotary calciner and said composite is contacted with said oxidizing gas at a rate of at least about 2 s.c.f.m./min. of said gas per pound of said composite retained in said heating zone and said oxidizing gas has an initial temperature of less than about 500° F. prior to contact with said composite in said heating zone.